May 21, 1929.  L. L. JONES  1,714,268
ART OF ASSEMBLING BEARINGS
Filed May 22, 1926
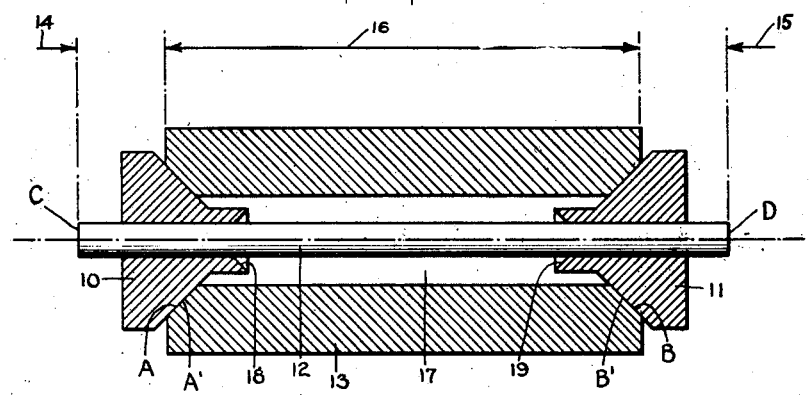
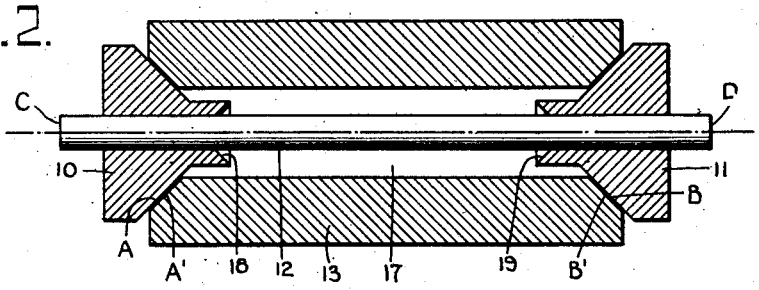
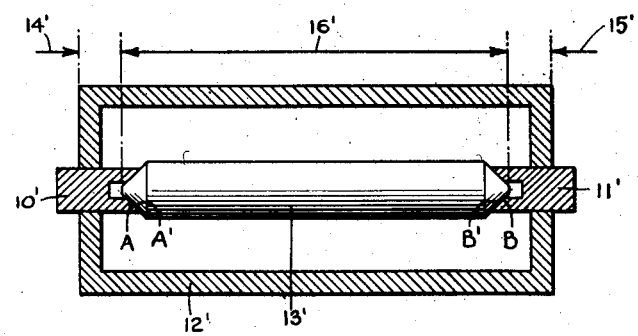
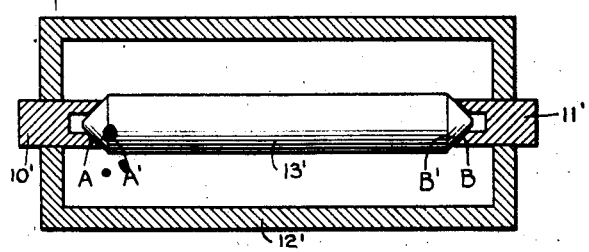
INVENTOR
Lester L. Jones
BY
ATTORNEYS Patented May 21, 1929.

1,714,268

UNITED STATES PATENT OFFICE.

LESTER L. JONES, OF ORADELL, NEW JERSEY.

ART OF ASSEMBLING BEARINGS.

Application filed May 22, 1926. Serial No. 111,073.

This invention relates to the art of making and assembling bearing structures for rotating machinery where absence of play or shake is desired.

It is well known that the play or shake in rotating bearings may be eliminated in the manufacture of machinery by either machining and grinding parts to a very high degree of accuracy or by making them fit snugly and then wearing the parts down in preliminary use, or by making some element associated with the bearing parts adjustable by screws or shims so as to accurately set the clearance to the thousandth or fraction of a thousandth of an inch.

My present invention has for its prime object the provision of a new method of assembling bearings from bearing parts which are not accurately machined and which do not include finely adjustable screws or shims, and relates to a bearing structure produced by such new method. The method embodying the invention is characterized by the rapidity and cheapness with which the parts may be assembled, such method obviating the costly precision machine work or the expert adjustment required in prior types of bearing structures. The method is especially applicable to those types of machinery where the wear is small and where the substantial absence of play, shake or vibration is essential for the correct functioning of the apparatus, such as in accurate indicating mechanisms, continuously variable electrical condensers, inductances and the like.

To the accomplishment of the foregoing and such other objects as will hereinafter appear, my invention consists in the elements and their relation one to the other as more particularly described hereinafter; reference being had to the accompanying drawings which show the preferred forms of my invention, and in which:

Figs. 1 and 2 are views showing sequential steps in the method of producing one form of the bearing, and Figs. 3 and 4 are views showing sequential steps in the method of producing a modified form of bearing.

Referring now in detail to the drawings and having reference first to Figs. 1 and 2 thereof, I show a bearing structure comprising a pair of bearing elements 10 and 11, a holder or support 12 on which the bearing elements are driven to fixed positions as will be pointed out hereinafter, and a complemental bearing element 13 providing opposed bearing seats A' and B' for the bearing surfaces A and B provided in the bearing elements 10 and 11. In the form of the invention shown in these Figs. 1 and 2, the bearing holder 12 comprises a shaft and the complemental bearing element 13 comprises a bearing box.

My present invention resides particularly in the method of assembling the bearing parts described so as to quickly and accurately set the play, of parts which are machined only to an accuracy of several thousandths, to a small fraction of a thousandth of an inch. This I accomplish by generating a working clearance between the bearing seats A', B' and the complemental bearing surfaces A and B by first placing one of the bearing structure parts under strain when the bearing elements are driven into engagement with the complemental bearing seats and by then releasing the said strain, the strain being predetermined so that the dimensions of a bearing part are varied due to the release of the strain in an amount equal to the clearance desired in the bearing.

As applied to the structure shown in Figs. 1 and 2, the bearing elements 10 and 11, which in the preferred form are tapered bearings as shown, are driven on the shaft or holder 12 into intimate engagement with the bearing cone surfaces A', B', while either the holder or shaft 12 is placed under a compressive force or the bearing box 13 is placed under an expansive force, said force being thereafter released to produce the clearance.

The method may be accomplished in at least any one of the following ways:

According to one method, the shaft 12 may be held under compression at its ends such as C and D while the cone elements 10 and 11 are being forced along the shaft into intimate engagement with the surfaces A' and B'. The compression existing on the shaft during this time is predetermined, so that the subsequent elongation of that section of the shaft between the cones A and B due to the release of the pressure is equal to the amount of clearance desired in the bearing. The comprehensive force exerted on the ends C, D of the shaft 12 may be represented by the opposed arrowed lines 14 and 15. It can be easily calculated or demonstrated experimentally that for bearings of average dimensions the compressional forces necessary are well within the safe limits for usual shaft materials and well within the capabilities of simple pressing machinery, especially for the generation of clearances of the order of two thousandths of an inch or less. This is the order of magnitude of the predetermined clearances desired in the class of machinery referred to above.

A second method of assembling the bearing parts utilizing my improved method is to first drive the tapered bearings 10 and 11 into intimate contact with the bearing surfaces A' and B' and then to apply the pressure to the shaft ends C and D so that the sliding back of the tapered bearings along the shaft due to the compression of the material between the tapered bearings is sufficient to generate the desired clearance after the axial pressure of the shaft is removed.

Another way of practicing the method of my invention which is especially applicable to large and heavy machinery where it would be otherwise expensive or impracticable to sufficiently compress the shaft is to produce a sufficient elongation of the complemental bearing element 13 so as to give the desired clearance when the elongation is removed. This may be most easily accomplished by heating the complemental bearing element 13 to a sufficient temperature so that the expansion of the material is equal to the clearance desired. After the complemental bearing element is hot the shaft 12 is inserted and the bearing elements 10 and 11 driven on into intimate contact with the bearing surfaces A' and B'; and upon cooling of the complemental bearing element 13 the desired clearance will be found to exist. This expansive force produced on the complemental bearing element 13 is represented in Fig. 1 by the arrowed line 16.

In the preferred construction a space 17 is provided between the bearing holder or shaft 12 and the complemental bearing element 13 intended to supply room for any metal shavings which might be formed when the bearing elements 10 and 11 are driven on the shaft 12. It will also be noted that the inner end corners 18 and 19 of the bearing elements 10 and 11 are tapered to facilitate driving on the shaft and to minimize the tendency to scrape the shaft. Fig. 2 shows the relation of the parts with the desired small working clearance produced between the bearing surfaces of the bearing elements and the complemental bearing seats when the strains either on the bearing holder 12 or on the complemental bearing element 13 are removed.

Referring now to Figs. 3 and 4 of the drawings, I show a modified form of bearing produced by the method of the present invention, Fig. 3 showing the bearing parts when one of the parts is under strain, and Fig. 4 showing the same with the strain released. In this form of the invention the bearing holder comprises a box or casing 12' in which the bearing elements 10' and 11' are driven, the said bearing elements being driven into engagement with the bearing surfaces of the complemental bearing element here in the form of a shaft 13'. Either the box 12' is placed under compression as indicated by the arrowed lines 14' and 15', or the complemental bearing element or shaft 13' is placed under an expansive force as indicated by the arrowed line 16' in Fig. 3 of the drawings, which compressive or expansive force is released to produce the working clearances between the bearing elements as shown in Fig. 4 of the drawings.

The manner of making and using the improved bearing embodying my invention and the practice of the method, as well as the advantages of the bearing structure, will in the main be fully apparent from the above detailed description thereof. It will be further apparent that numerous modifications may be made in the structure described without departing from the spirit of the invention. For example, the complemental bearing surfaces, while preferably tapered, may be made in any desired contour. Also while the driving engagement between the movable bearing element and the holder therefor is preferably a sliding frictional engagement, it will be manifest that the same may be any other form of engagement, such for example as a screw engagement. Other and more numerous changes may be made in the structure or in the method of applying the invention without departing from the essence of the invention defined in the following claims.

I claim:

1. The method of assembling bearing structures which consists in driving a bearing element on a holder into engagement with the bearing seat of a complemental bearing element and in generating a working clearance between the bearing element and its seat by first placing one of the bearing structure parts under strain with the bearing element in engagement with the bearing seat and by then releasing the said strain, the release of the strain automatically effecting that relative movement between the bearing element and its seat which produces the clearance.

2. The method of assembling bearing structures which consists in driving a tapered bearing element on a holder into engagement with a tapered bearing seat of a complemental bearing element and in generating a working clearance between the bearing element and its seat by first placing one of the bearing structure parts under strain with the bearing element in engagement with the bearing seat and by then releasing the said strain, the release of the strain automatically effecting that relative movement between the bearing element and its seat which produces the clearance.

3. The method of assembling bearing structures which consists in driving a pair of bearing elements on a holder into engagement with opposed bearing seats of a complemental bearing element and in generating a working clearance between the bearing elements and their seats by first placing one of the bearing structure parts under strain with the bearing elements in engagement with their bearing seats and by then releasing the said strain, the release of the strain automatically effecting that relative movement between the bearing elements and their seats which produces the clearance therebetween.

4. The method of assembling bearing structures which consists in driving a bearing element frictionally slidable on a holder or support into engagement with the bearing seat of a complemental bearing element and in generating a working clearance between the bearing element and its seat by first placing the bearing holder under a predetermined compressive strain and by then releasing said strain, the strain being such as to produce the working clearance when released.

5. The method of assembling bearing structures which consists in driving a pair of bearing elements frictionally slidable on a holder or support into engagement with opposed bearing seats of a complemental bearing element and in generating a working clearance between the bearing elements and their seats by first placing the bearing holder under a predetermined compressive strain and by then releasing said strain, the strain being such as to produce the working clearance when released.

6. The method of assembling bearing structures which consists in driving a pair of tapered bearing elements at least one of which is frictionally slidable on a holder or support into engagement with opposite tapered bearing seats of a complemental bearing element and in generating a working clearance between the bearing elements and their seats by first placing the bearing holder under a predetermined compressive strain and by then releasing the said strain, the strain being such as to produce the working clearance when released.

7. The method of assembling bearing structures which consists in frictionally driving a pair of bearing elements on a bearing holder into intimate engagement with opposed bearing seats of a complemental bearing element and in generating a working clearance between the bearing elements and their seats by first placing the holder under a compressive force and by then releasing the said force, the compressive force being predetermined so that the subsequent elongation of the holder when the force is released is equal to the amount of clearance desired in the bearing.

8. A bearing structure comprising a bearing element, a holder or support on which the bearing element is frictionally slidable and driven to a fixed position, a complemental bearing element provided with a bearing seat for the bearing element, the bearing element being separated from the bearing seat by a working clearance generated by first placing one of the bearing structure parts under strain when the bearing element is in driven engagement with the complemental bearing seat and by then releasing the said strain, the release of the strain automatically effecting that relative movement between the bearing element and its seat which produces the clearance.

9. A bearing structure comprising a pair of bearing elements, a holder or support on which the bearing elements are driven to fixed positions, a complemental bearing element provided with bearing seats for the bearing elements, the bearing elements being separated from their bearing seats by working clearances generated by first placing one of the bearing structure parts under strain when the bearing elements are in driven engagement with the complemental bearing seats and by then releasing the said strain.

10. A bearing structure comprising a bearing element, a holder or support on which the bearing element is driven to a fixed position, a complemental bearing element provided with a bearing seat for the bearing element, the bearing element being separated from the bearing seat by a working clearance generated by first placing the bearing holder under a compressive force when the bearing element is in engagement with the complemental bearing seat and by then releasing the said force, the compressive force being predetermined so that the subsequent elongation of the holder between the bearing elements due to the release of the force is equal to the amount of working clearance desired.

11. A bearing structure comprising a pair of bearing elements, a holder or support on which the bearing elements are driven to a fixed position, a complemental bearing element provided with opposed bearing seats for the bearing elements, the bearing elements being separated from the bearing seat by working clearances generated by first placing the bearing holder under a compressive force when the bearing element is in engagement with the complemental bearing seat and by then releasing the said force, the compressive force being predetermined so that the subsequent elongation of the holder between the bearing elements due to the release of the force is equal to the amount of working clearance desired.

12. The method of assembling bearing structures which consists in driving a bearing element on a holder or support into engagement with the bearing seat of a complemental bearing element and in generating a working clearance between the bearing element and its seat by first placing the bearing holder under a predetermined strain to produce molecular stresses in the material under strain and by then releasing said strain, the strain being such as to produce the working clearance when released.

13. The method of assembling bearing structures which consists in driving a pair of bearing elements on a holder or support into engagement with opposed bearing seats of a complemental bearing element and in generating a working clearance between the bearing elements and their seats by first placing the bearing holder under a predetermined strain to produce molecular stresses in the material under strain and by then releasing said strain, the strain being such as to produce the working clearance when released.

Signed at New York city, in the county of New York and State of New York this 18th day of May, A. D. 1926.

LESTER L. JONES.